United States Patent [19]
Inoue

[11] Patent Number: 5,475,627
[45] Date of Patent: Dec. 12, 1995

[54] DIGITAL WAVE SYNTHESIZER WITH ADDRESS CONVERSION FOR REDUCING MEMORY CAPACITY

[75] Inventor: Takehiro Inoue, Amagasaki, Japan

[73] Assignee: Mitsubishi Denki Kabushiki Kaisha, Tokyo, Japan

[21] Appl. No.: 190,844

[22] Filed: Feb. 3, 1994

[30] Foreign Application Priority Data

Feb. 24, 1993 [JP] Japan .................................. 5-033882

[51] Int. Cl.⁶ ..................................................... G06F 1/02
[52] U.S. Cl. ............................................. 364/721; 327/106
[58] Field of Search ............................. 364/721; 328/14; 327/106

[56] References Cited

U.S. PATENT DOCUMENTS

| | | | |
|---|---|---|---|
| 4,159,527 | 6/1971 | Yahata et al. | 364/721 |
| 4,476,536 | 10/1984 | Jones, Jr. | 364/721 |
| 4,484,296 | 11/1984 | Treise et al. | 364/721 |
| 4,652,832 | 3/1987 | Jasper | 364/721 |
| 4,809,205 | 2/1989 | Freeman | 364/721 |

FOREIGN PATENT DOCUMENTS 3-253108  11/1991  Japan .

OTHER PUBLICATIONS

"Direct Digital Frequency Synthesizer", The 35th Annual Frequency Control Symposium, May 1981, pp. 1–9.

*Primary Examiner*—Tan V. Mai
*Attorney, Agent, or Firm*—Rothwell, Figg, Ernst & Kurz

[57] ABSTRACT

A digital synthesizer is provided with an address converter means for converting a phase value in the region of small amplitude change all to a predetermined value, utilizing the characteristics of a sinusoidal function. In addition, a digital synthesizer is provided with a second address converter for converting the phase value in a range of 0°~360° to a phase value of 0°~90° and an output data inverter inverting the memory output in response to the phase value. By converting a phase value in the region of a small amplitude change to a predetermined value, the amplitude value to be stored in the memory can be reduced by that degree, and reduction in the memory capacity and reduction in the power dissipation are achieved. Furthermore, by converting the phase value in a range of 0°~360° to a phase value of 0°~90° utilizing symmetry of the sinusoidal function, the amplitude value to be stored in the memory can be reduced to one-fourth, thereby further reduction in the memory capacity and further reduction in the power dissipation are achieved.

3 Claims, 4 Drawing Sheets

| | INTEGRATOR OUTPUT | PHASE | QUAD OUTPUT(14BIT) | MEMORY OUTPUT(10BIT) | MEMORY OUTPUT INVERTER OUTPUT(10BIT) |
|---|---|---|---|---|---|
| OUTPUT DATA | 0000 ∫ 3FFF | 0° ∫ 90° | 0000 ∫ 3FFF | 200 ∫ 3FF | 200 ∫ 3FF |
| | 4000 ∫ 7FFF | 90° ∫ 180° | 3FFF ∫ 0000 | 3FF ∫ 200 | 3FF ∫ 200 |
| | 8000 ∫ BFFF | 180° ∫ 270° | 0000 ∫ 3FFF | 200 ∫ 3FF | 1FF ∫ 000 |
| | C000 ∫ FFFF | 270° ∫ 360° | 3FFF ∫ 0000 | 3FF ∫ 200 | 000 ∫ 1FF |

20

DIGITAL WAVE SYNTHESIZER WITH ADDRESS CONVERSION FOR REDUCING MEMORY CAPACITY

FIELD OF THE INVENTION

The present invention relates to a digital synthesizer that produces a waveform of an arbitrary frequency the frequency value of which is from the outside, employing directly amplitude data of sinusoidal wave stored in a memory.

BACKGROUND OF THE INVENTION

FIG. 8 is a block diagram of a prior art direct digital synthesizer (hereinafter referred to as DDS). In the figure, an integrator 1 is provided for performing an integration of a frequency value f that is input to the integrator 1, upon receipt of each master clock. A memory 3 is provided for outputting required data in response to the signal output from the integrator 1, storing data of phase resolution from 0°~360°. A D/A converter 4 is provided for D/A converting the signal output from the memory 3. A low-pass filter (hereinafter referred to as LPF) 5 is provided for receiving the signal output from the D/A converter 4. A master clock MC is input to the integrator 1 and the D/A converter 4.

A description is given of the operation of this prior art DDS.

A frequency value f in a digital form corresponding to a required frequency is input to the integrator 1. A master clock MC is input to the integrator 1, and each time when this clock is input the frequency value f is integrated. The output of the integrator 1 is input to the memory 3 as address data. This memory 3 stores amplitude data of a sinusoidal wave, and amplitude data of the sinusoidal wave is output that varies each time the input address, i.e., phase value of the sinusoidal wave varies.

The output of this memory 3 is input to the D/A converter 4 to which the master clock MC is input, and is converted into an analog signal. As a result, a sinusoidal wave which is converted into an analog signal is output from the D/A converter 4. Further, the output of the D/A converter 4 becomes a sinusoidal wave in which harmonic wave components are removed by the low-pass filter 5.

The prior art digital synthesizer is constructed as described above, and the memory for converting the phase value of the sinusoidal wave into an amplitude value stores data of phase resolution from 0°~360°, and if the phase resolution is increased, the capacity of the memory increases exponentially by that degree, thereby increasing the gate size of the memory and increasing the power consumption.

SUMMARY OF THE INVENTION

It is an object of the present invention to provide a digital synthesizer that can reduce the memory capacity without largely deteriorating the phase resolution and thereby reduce the power dissipation as well as that can miniaturize the circuit size.

Other objects and advantages of the present invention will become apparent from the detailed description given hereinafter; it should be understood, however, that the detailed description and specific embodiment are given by way of illustration only, since various changes and modifications within the scope of the invention will become apparent to the those skilled in the art from this detailed description.

According to a first aspect of the present invention, a digital synthesizer is provided with an address conversion means for converting a phase value in the region of small amplitude change to a predetermined value. In addition, a digital synthesizer according to the present invention is provided with a second address conversion means for converting the phase value 0°~360° to a phase value of 0° ~90° and an output data inverting means for inverting the memory output in response to the phase value.

By converting the phase value in that region to a predetermined value in response to a phase value in the region of a small amplitude change, the amplitude value to be stored in the memory can be reduced by that degree, and reduction in the memory capacity and the reduction in the power dissipation are achieved.

By converting the phase,value of 0°~360° to a phase value of 0°~90° employing symmetry of the sinusoidal function, the amplitude value to be stored in the memory can be reduced to one-fourth, thereby reduction in the memory capacity and reduction in the power dissipation are achieved.

DETAILED DESCRIPTION OF THE PREFERRED EMBODIMENTS

Embodiment 1

Figure 1:
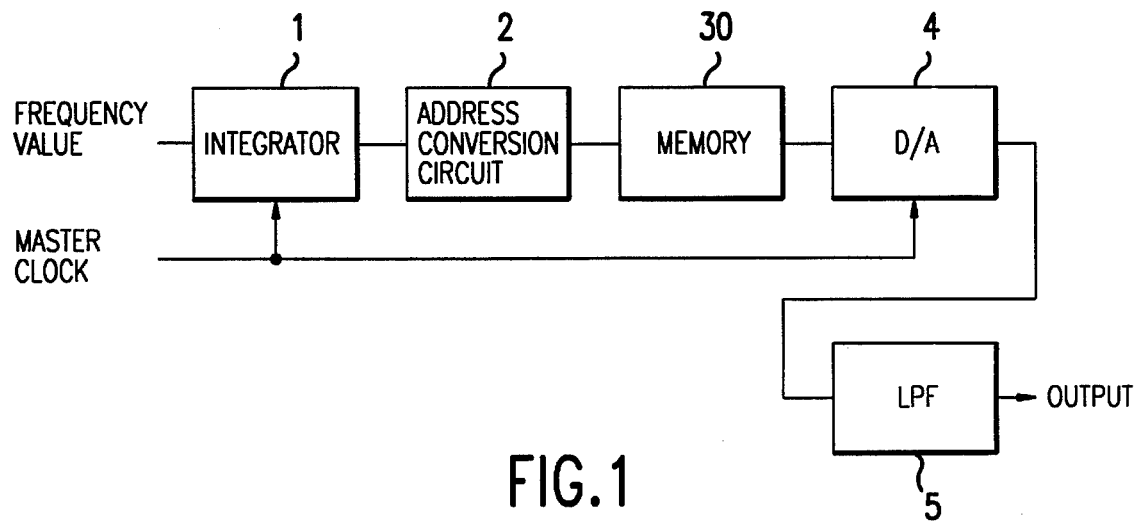
FIG. 1 is a diagram showing a block construction of a digital synthesizer according to a first embodiment of the present invention.
Figure 8:
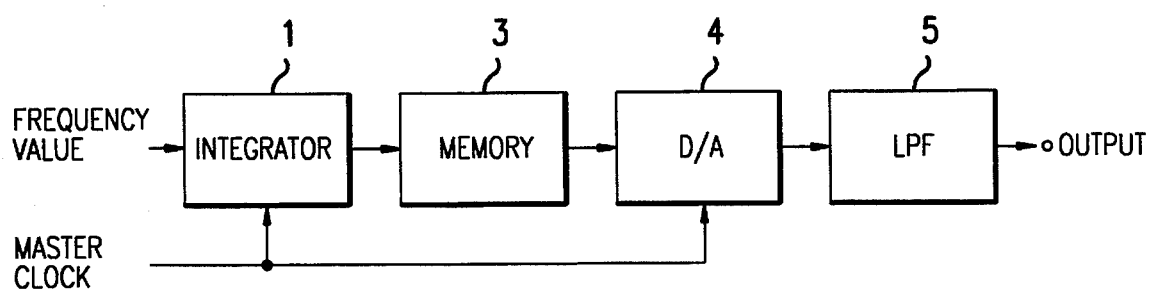
FIG. 8 is a diagram showing a block construction of a prior art direct digital synthesizer.

FIG. 1 shows a digital synthesizer according to a first embodiment of the present invention. In FIG. 1, the same reference numerals used in FIG. 8 designate the same or corresponding portions. An address conversion circuit 2 is provided for converting the address value, i.e., phase value of the sinusoidal wave output from the integrator 1 to an input address of the memory 30 in accordance with that phase value. A memory 30 is provided for outputting the stored data in response to the output from the address conversion circuit 2, and in this memory 30 amplitude data for individual phase value of large amplitude change are stored and amplitude data of sinusoidal wave of phase values of 90° and 270° are stored.

A description is given of the operation.

A frequency value in digital form corresponding to a desired frequency is input to the integrator 1. A master clock MC is input to the integrator 1, and each time when this clock is input the frequency value is integrated. The output of the integrator 1 becomes an address data input of the address conversion circuit 2. This address conversion circuit 2 functions to convert the phase value of large amplitude changes, i.e., phase value in the vicinity of 0° and 180°, to the input address of the memory representing the phase values as is, and converts the i.e. phase values of small amplitude change (i.e. phase values in the vicinity of 90° and 270°) to the input address of the memory representing the phase values of 90° and 270° respectively in response to the input address (refer to FIG. 4).

Figure 4:
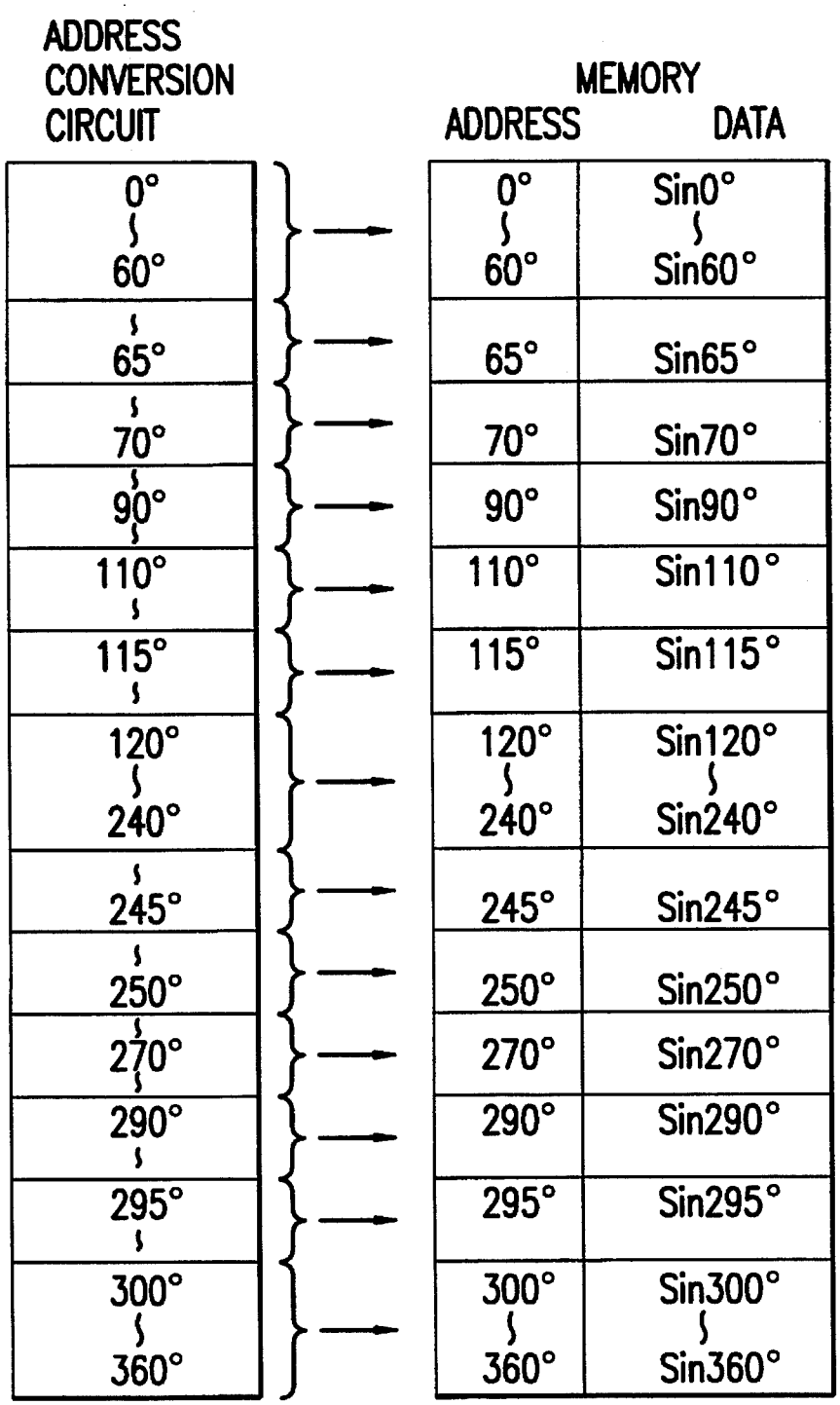
FIG. 4 is a diagram showing the address map between the address conversion circuit and the memory in the digital synthesizer of the first embodiment.

The memory 30 stores the phase value of large amplitude change and amplitude data of sinusoidal wave of 90° and 270°, and it outputs amplitude data of sinusoidal wave changing each time the input address, i.e., the phase value of the sinusoidal wave changes (refer to FIG. 4). The output of the memory 30 is input to the next stage D/A converter 4, and is converted into an analog signal by the D/A converter 4. As a result, a sinusoidal wave converted into an analog signal is output from the D/A converter 4. Thus the output of the D/A converter 4 is a sinusoidal wave in which the harmonic wave signals are removed by the low-pass filter 5.

Figure 2:
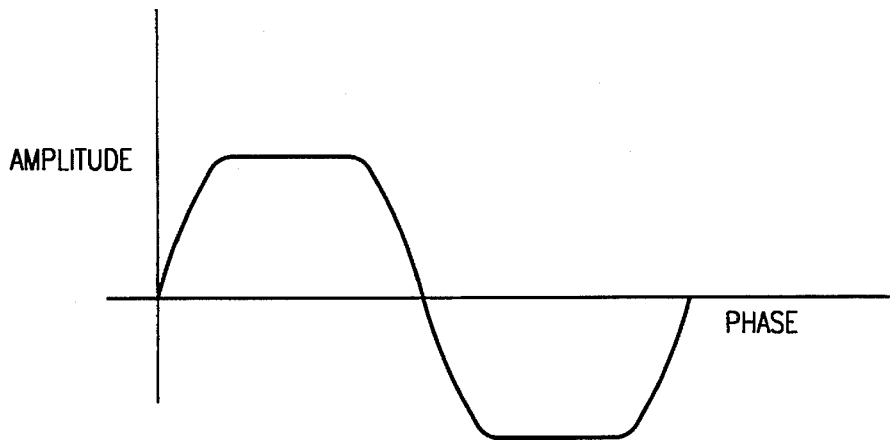
FIG. 2 is a diagram showing output waveform of the digital synthesizer.
Figure 3:
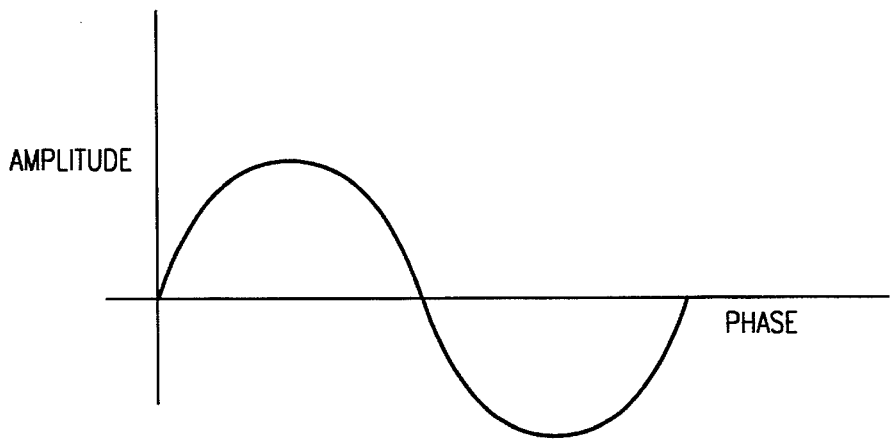
FIG. 3 is a diagram showing output waveform of the prior art digital synthesizer.

The sinusoidal wave that is output through the above-described operation is shown in FIG. 2, and the output sinusoidal wave of the prior art DDS is shown in FIG. 3, respectively. As is apparent from FIGS. 2 and 3, while in the present invention a distortion of waveform is seen in that the amplitude data is minimized, there is no variation in the frequency.

As is evident from the above description, this first embodiment provides an address conversion circuit 2, and the phase values in the vicinity of 90° and 270° having small amplitude change are totally dealt with as phase values representing 90° and 270° respectively. Therefore, there is no necessity to store detailed amplitude data of sinusoidal wave in the vicinity of 90° and 270° in the memory 30, whereby the memory capacity is reduced by that degree and the power dissipation is also reduced.

Embodiment 2

Figures 5, 6:
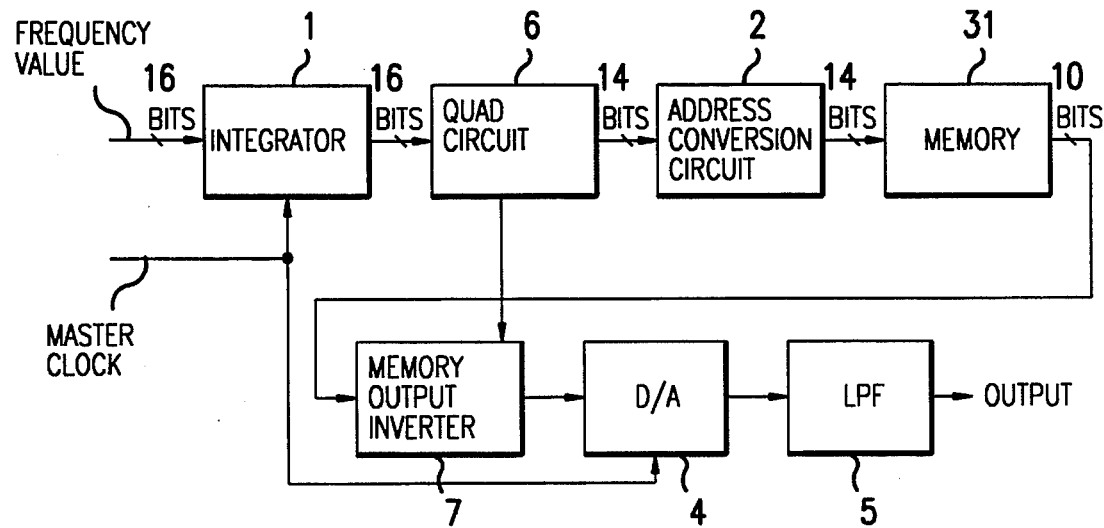
FIG. 5 is a diagram showing a block construction of a digital synthesizer according to a second embodiment of the present invention.
FIG. 6 is a diagram showing an overview of output data of respective circuits in the digital synthesizer according to the second embodiment of the present invention.

FIG. 5 shows a digital synthesizer according to a second embodiment of the present invention. In FIG. 5, a quad (quadrature) circuit 6 is provided for converting the phase value of 0°~360° which is the output value of the integrator 1 to a phase value of 0°~90°. An address conversion circuit 2 is provided for converting the output value of the quad circuit 6, i.e., the address value to the input address of the memory 30 in accordance with its phase value. A memory output inverter 7 is provided for inverting or non-inverting the output of the memory 31 in accordance with the output phase value of the integrator 1, controlled by the quad circuit 6. A D/A converter 4 is provided for receiving the output of the memory output inverter 7 to D/A convert the same. A low-pass filter 5 is provided for receiving the output of the D/A converter 4 to only pass the low frequency component thereof. In the memory 31 the amplitude data of sinusoidal wave of 0°~90° are stored.

A description is given of the operation.

A frequency value f (16 bit data) corresponding to a required frequency is input to the integrator 1. A master clock MC is input to the integrator 1 as in the above embodiment, and each time when this clock is input, the frequency value is integrated. The output (16 bit data) from this integrator 1 is input to the quad circuit 6, and in the quad circuit 6 it is judged whether the frequency value is in a range of 0°~90°, 90°~180°, 180°~270°, or 270°~360° from the upper two bits of the input data.

The quad circuit 6 outputs the phase value (i.e., address data) as is for input phase value of 0°~90°, and outputs the phase value with bits other than the upper two bits of the input phase value inverted for input the phase values of 90°~180°. Further, the quad circuit 6 outputs the phase value as is for input phase values of 180°~270°, and causes all bits of the memory 31 output to be inverted by controlling the memory output inverter 7. Furthermore, the quad circuit 6 outputs the phase value with bits other than the upper two bits of the input phase value inverted for input phase values of 270°~360°, and causes all bits of the memory 31 output to be inverted by controlling the memory output inverter 7. The manner of conversion of the above-described data is shown in FIG. 6.

The output of the quad circuit 6 thus obtained becomes address data of the address conversion circuit 2 at a latter stage. This address conversion circuit 2 performs a similar operation as in the above-described first embodiment, but because the phase value input is 0°~90°, it performs an operation of data handling correcting the value of 60°~65° to a phase value of 65°, the value, of 65°~70° to a phase value of 70°, and value of 70°~90° to a phase value of 90°. The amplitude data corresponding to this converted address is stored in the memory 31, and sinusoidal wave amplitude data that changes each time the input address, i.e., phase value of sinusoidal wave changes is output.

Figure 7:
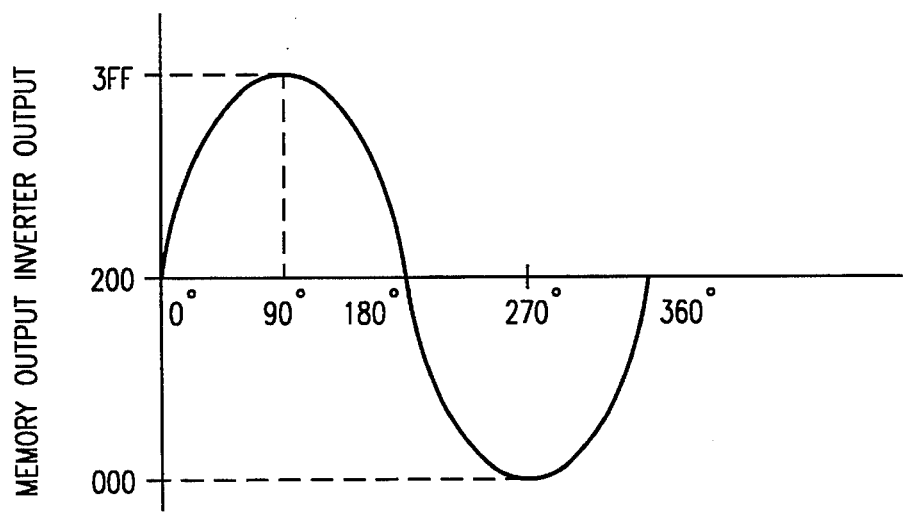
FIG. 7 is a diagram showing an output of the memory inverting circuit against the phase of the input in the digital synthesizer of the second embodiment of the present invention.

The output of this memory 31 enters into the memory output inverter 7 that is controlled by the quad circuit 6, and the output data of the memory 31 thus modified in accordance with a phase value of the output of the integrator 1. The output of the memory output inverter 7 is shown in FIG. 7. The output of this memory output inverter 7 enters into the next stage D/A converter 4, and the sinusoidal wave that is converted into an analog signal is output. The output of the D/A converter 4 is a sinusoidal wave in which the harmonizing wave components are removed by the low-pass filter 5.

As is evident from the foregoing description, according to this second embodiment, there is provided a quad circuit 6 which converts the phase values of 0°~360° as the output value of the integrator 1 to a phase values of 0°~90° and inverts the output of the memory 3 for required bits by controlling the memory output inverter 7 when the phase value is above 90° and this makes it only necessary to store the amplitude data of 0°~90° in the memory 31. Therefore, the amplitude value to be stored in the memory can be reduced to one-fourth relative to the prior art device, thereby further reducing the memory capacity and the power dissipation.

As is evident from the foregoing description, according to the digital synthesizer of present invention, the phase value in the region of small amplitude change is converted to a constant value in the conversion of the phase value, thereby the amplitude values to be stored in the memory can be reduced by that extent. This results in reduction in the memory capacity, reduction in the circuit size, and further reduction in the power dissipation without largely deteriorating the phase resolution.

Furthermore, by converting the phase values in a range of 0°~360° to the phase value of 0°~90° utilizing the symmetry of the sinusoidal function, the amplitude values to be stored in the memory can be reduced to one-fourth. Thus, miniaturization of the circuit size and reduction in the power dissipation can be further achieved.

What is claimed is:

1. A digital wave synthesizer, comprising:

an integrator which receives a frequency value of a desired sinusoidal wave and outputs an instantaneous phase value of said wave obtained by integrating said frequency value upon receipt of each master clock pulse of a master clock;

a memory which receives an address value and outputs a sinusoidal amplitude data in accordance therewith;

a D/A converter which converts the output of said memory to analog data; and address conversion means which receives the output of said integrator and converts the same in a region of phases of said wave having small amplitude change to a predetermined address value for said memory.

2. The digital wave synthesizer of claim 1, wherein said address conversion means converts phase values in the vicinity of 90° and 270° output from said integrator to address values representing 90° and 270°, respectively.

3. The digital wave synthesizer of claim 1, further comprising:

second address conversion means which converts phase values output from said integrator representing phases in a range of 0°–360° to address values representing phases in a range of 0°–90°; and output data inverting means which inverts the output data of said memory in accordance with the phase value of the output of said integrator.

* * * * *

UNITED STATES PATENT AND TRADEMARK OFFICE
CERTIFICATE OF CORRECTION

PATENT NO. : 5,475,627
DATED : December 12, 1995
INVENTOR(S) : Takehiro Inoue

It is certified that error appears in the above-indentified patent and that said Letters Patent is hereby corrected as shown below:

In the Abstract: Line 2, delete "means"; Line 7, before "inverting" insert -- for --; Line 13, "value" should be -- values --; Line 14, delete "a" (second occurrence); same line, "value" should be -- values --; same line, after "utilizing" insert -- the --;

Col. 2, line 17, after "employing" insert -- the --; Col. 2, line 18, "value" should be -- values --; Col. 2, line 64, "value" should be -- values --; Col. 3, line 3, delete "when"; Col. 3, line 7, "value" should be -- values --; Col. 3, line 11, after "i.e." insert a comma; Col. 3, line 46, "value" (first occurrence) should be -- values --; Col. 3, line 47, delete "a"; same line, "value" should be -- values --; Col. 3, line 64, delete "when"; Col. 4, line 4, "value" should be -- values --; Col. 4, line 30, after "31" insert -- is --; Col. 4, line 41, delete "the" (first occurrence); Col. 4, line 42, delete "a"; Col. 4, line 47, "value" should be -- values --; Col. 4, line 52, delete "the" (second occurrence); same line, "value" should be -- values --; Col. 4, line 53, "is" should be -- are --; Col. 4, line 61, delete "the" (first occurrence); same line, "value" should be -- values --.

Signed and Sealed this

Eleventh Day of June, 1996

Attest:

BRUCE LEHMAN

Attesting Officer
Commissioner of Patents and Trademarks